US012672658B2

(12) United States Patent (10) Patent No.: US 12,672,658 B2
Mizushima (45) Date of Patent: Jul. 7, 2026

(54) OIL-AND-FAT COMPOSITION

(71) Applicant: FUJI OIL HOLDINGS INC., Osaka (JP)

(72) Inventor: Shigeki Mizushima, Izumisano (JP)

(73) Assignee: FUJI OIL CO., LTD., Osaka (JP)

( * ) Notice: Subject to any disclaimer, the term of this patent is extended or adjusted under 35 U.S.C. 154(b) by 788 days.

(21) Appl. No.: 17/264,039

(22) PCT Filed: Aug. 7, 2019

(86) PCT No.: PCT/JP2019/031141
§ 371 (c)(1),
(2) Date: Jan. 28, 2021

(87) PCT Pub. No.: WO2020/032107
PCT Pub. Date: Feb. 13, 2020

(65) Prior Publication Data
US 2021/0345633 A1 Nov. 11, 2021

(30) Foreign Application Priority Data
Aug. 9, 2018 (JP) ................................. 2018-150616

(51) Int. Cl.
*A23D 7/005* (2006.01)
*A23D 9/013* (2006.01)
*C11B 5/00* (2006.01)

(52) U.S. Cl.
CPC ............. *A23D 7/005* (2013.01); *A23D 9/013* (2013.01); *C11B 5/0021* (2013.01)

(58) Field of Classification Search
CPC ....... A23D 7/005; A23D 9/013; C11B 5/0021
See application file for complete search history.

(56) References Cited

U.S. PATENT DOCUMENTS

| | | | | |
|---|---|---|---|---|
| 5,140,043 | A | 8/1992 | Darr et al. | |
| 8,211,472 | B2 | 7/2012 | Okumura et al. | |
| 2003/0045573 | A1* | 3/2003 | Afriat ..................... | A61K 8/894 514/474 |
| 2011/0008445 | A1 | 1/2011 | Okumura et al. | |
| 2015/0018435 | A1* | 1/2015 | Fichtali ................... | A61P 25/24 426/549 |
| 2020/0288743 | A1 | 9/2020 | Kato et al. | |
| 2020/0347300 | A1 | 11/2020 | Kato et al. | |
| 2021/0161165 | A1 | 6/2021 | Morikawa et al. | |

FOREIGN PATENT DOCUMENTS

| | | |
|---|---|---|
| CN | 101522163 | 9/2009 |
| JP | 1-265870 | 10/1989 |
| JP | 9-235584 | 9/1997 |
| JP | 2001-131572 | 5/2001 |
| JP | 2004-155733 | 6/2004 |
| JP | 2006-111554 | 4/2006 |
| JP | 2007-174992 | 7/2007 |
| JP | 2012-200226 | 10/2012 |
| JP | 2012-201771 | 10/2012 |
| JP | 2014-187930 | 10/2014 |
| WO | 01/96506 | 12/2001 |
| WO | 2011/102477 | 8/2011 |
| WO | 2017/149701 | 9/2017 |
| WO | 2017/150558 | 9/2017 |
| WO | 2019/044351 | 3/2019 |

OTHER PUBLICATIONS

Mosca et al., "Biocompatible water-in-oil emulsion as a model to study ascorbic acid effect on lipid oxidation". J. Phys. Chem. B 2008, 112, 4635-4641. (Year: 2008).*
"International Cenological Codex". Available online at https://www.oiv.int/public/medias/4053/e-coei-1-ascaci.pdf on 2007 (Year: 2007).*
International Search Report issued Oct. 29, 2019 in International (PCT) Application No. PCT/JP2019/031141.
International Preliminary Report on Patentability issued Feb. 9, 2021 in International (PCT) Application No. PCT/JP2019/031141.
Office Action issued Feb. 18, 2023 in corresponding Chinese Patent Application No. 201980053197.6, with English translation.
Tie Burong et al., Inorganic Chemistry, first edition, Aug. 2016, p. 151.
Examination report No. 1 issued Apr. 23, 2024 in corresponding Australian Application No. 2019317918.
Office Action issued Oct. 10, 2024 in Korean Patent Application No. 10-2021-7005048, with English-language translation.
Office Action issued Oct. 18, 2024 in Australian Patent Application No. 2019317918.

* cited by examiner

*Primary Examiner* — Erik Kashnikow
*Assistant Examiner* — Assaf Zilbering
(74) *Attorney, Agent, or Firm* — Wenderoth, Lind & Ponack, L.L.P.

(57) ABSTRACT

The present invention addresses the problem of providing an ascorbic acid-containing oil and fat that allows improvement of ascorbic acid content in the ascorbic acid-containing oil and fat and that can be used for a variety of food items. In this oil-and-fat composition, an appropriate amount of ascorbic acid is contained, and the ascorbic acid is contained as an aqueous solution having a pH of 2.5-5.3.

6 Claims, No Drawings

OIL-AND-FAT COMPOSITION

TECHNICAL FIELD

The present invention relates to a fat composition in which fat-insoluble ascorbic acid is stably dispersed in a wide range of concentration.

BACKGROUND ART

Due to increasing social concern about health problems such as aging society, and increase in medical costs, there is needed to provide products for health, and there has been a similar demand for a fat which is indispensable to food cooking.

Fat is known to deteriorate similarly to other substances. For example, peroxide substances produced due to oxidization of fat may impair not only flavor but also human health. Therefore, fat for health may be provided by preventing oxidization.

Meanwhile, although the "Dietary Reference Intakes for Japanese (2005)" describes that sodium chloride intake required by an adult per day is approximately 1.5 g, in the result of recent Japanese national nutrition survey, it is reported that Japanese take approximately 10 to 12 g of excessive sodium chloride per day, and this is excessive intake of sodium chloride. Intake of sodium chloride closely relates to lifestyle diseases such as heart disease and hypertension. Fat that enhances salty taste leads to decrease in the sodium chloride intake, and such fat may be said to have a consideration for health.

Regarding fat in which ascorbic acid is dispersed, Patent Document 1 describes an effect of preventing oxidization, and Patent Document 2 describes that ascorbic acid-containing fat has an effect of enhancing salty taste.

As a technique of allowing ascorbic acid to be contained at a high concentration in fat, Patent Document 4 shows a fat-insoluble antioxidant composition having improved solubility in fat obtained by a method including dissolving the antioxidant that is insoluble in fat and readily soluble in alcohol in alcohol, and then obtaining a mixed solution by dissolving the alcohol solution in di- or tri-basic acid ester of monoglyceride, and then further dissolving the solution in polyglycerol condensed ricinoleic acid ester. Patent Document 4 exemplifies ascorbic acid as the antioxidant that is insoluble in a fat and readily soluble in alcohol.

Also, Patent Document 5 discloses a method of producing fat containing organic acid and/or salts thereof, the method including adding the organic acid and/or salts thereof in the form of powder to fat, and stirring them under the condition of 100 to 190° C. and 0.5 to 100 Torr (0.067 to 13.33 kPa), followed by filtration. Patent Document 3 discloses, particularly as a method for improving oxidative stability of highly unsaturated fatty acid-containing fat, a method of adding salts of organic acid such as ascorbic acid as a water-in-oil type emulsion to fat.

PRIOR ART DOCUMENTS

Patent Documents

Patent Document 1: WO 2001/096506 A1
Patent Document 2: WO 2011/102477 A1
Patent Document 3: JP H09-235584 A
Patent Document 4: JP 2001-131572 A
Patent Document 5: JP 2012-201771 A

SUMMARY OF INVENTION

Problems to be Solved by Invention

There is considerably high concern about the effect of preventing oxidization by ascorbic acid and the effect of enhancing salty taste disclosed in Patent Documents 1 and 2, and wide supply of fats containing ascorbic acid has been desired.

Patent Documents 1 and 2 describe that the amount of ascorbic acid blended in fat is limited to several tens ppm. When ascorbic acid-containing fat having such a concentration is used, a large amount needs to be blended in foods to exert the effect of the ascorbic acid-containing fat, and thus fat components increase in some cases. This arises the problem of increasing in limitation on food design. Further, when fat is used for an oily food containing a relatively large amount of fat, the concentration of ascorbic acid is diluted with other fats contained in the food, and thus a desired effect cannot be obtained in some cases.

Thus, it is conceived that when the content of ascorbic acid in ascorbic acid-containing fat is improved, the effect of ascorbic acid-containing fat may be enlarged in a wide range of foods, leading to expectation to contribute to common health.

Further, since the range of content of fat contained in foods is wide as described above, if ascorbic acid-containing fat that is allowed to be adapted for a wide range of concentration would be available in various foods.

In the case of where ascorbic acid cannot be stably dispersed in fat, as a result of which precipitation occurs, not only the function required for ascorbic acid-containing fat decreases, but also the precipitation part has a strong sour taste and thus exhibits inferior eating quality. Also in a case where ascorbic acid is dispersed at a high concentration, it is important to be a fat composition that does not cause precipitation and ensures stable dispersion. Thus, also in foods using such an ascorbic acid-containing fat composition, the ascorbic acid-containing fat composition is required to be easily stably dispersed.

When a concentration of ascorbic acid is low, various edible fats can be used to obtain a fat composition containing ascorbic acid. However, in the case of where the composition is prepared using a fat which is solid at room temperature, such as palm oil, the composition containing ascorbic acid which is solid at room temperature may be kept at a high temperature and stirred in a raw material tank, for example, by a customer. Stable dispersion of the ascorbic acid is ensured by the dissolution of ascorbic acid in the water contained in the fat. However, under such conditions, precipitation of ascorbic acid occurs due to coalescence of aqueous phases containing ascorbic acid or dehydration. As a result, not only the original function is lost, but also stable production cannot be performed. Thus, the ascorbic acid content has to be extremely low, and thereby a sufficient effect may not be obtained. Therefore, an improvement is desired.

Focusing on the conventional art regarding improvement of the content of ascorbic acid in ascorbic acid-containing fat, in Patent Documents 1 and 2, the amount of ascorbic acid blended in fat is limited to several tens ppm as described above. In particular, there is described "when a content of greater than 28 ppm of an organic acid is added to fat, the crystal of organic acid precipitates, and it is difficult to allow the organic acid to be contained in the fat".

It has been therefore difficult to allow ascorbic acid to be contained at a high concentration.

Patent Document 3 is a technique of dispersing an aqueous solution of an antioxidant in oil; however, the ascorbic acid content in oil at 6,000 ppm is evaluated as being poor dispersibility. Further, also in Examples other than the above description, long-term preservation and presence or absence of precipitation are not evaluated. Such a technique is therefore not considered to be adapted for fat distributed for a long period of time (for example, one year at normal temperature). When an ascorbic acid aqueous solution having poor storage stability is blended in fat, the solution is coalesced and a precipitation of the ascorbic acid is occurred, and a function of ascorbic acid is impaired. In this method, ascorbic acid is added as an aqueous solution (21.4 parts of ascorbic acid relative to 100 parts of water), and the amount of water blended increases with increase in the amount of ascorbic acid blended. The solubility of ascorbic acid in water is 33.3 g at 20° C. relative to 100 g of water, and water in a large amount as much as three times or more the amount of ascorbic acid needs to be blended relative to ascorbic acid. Thus, with this method, it is considered to be difficult to design fat containing ascorbic acid at a high concentration and having dispersion stability for a long period of time.

Patent Document 4 describes ethanol is used as alcohol for a substantial use in foods. However, ascorbic acid cannot be said to be easily dissolved in ethanol, and only approximately 2% is dissolved in 100 g of ethanol at room temperature (20° C.). That is, with this method, it is difficult to produce fat containing ascorbic acid at a high concentration. Even if it is blended, such fat contains a large amount of alcohol, and thus use thereof is considered to be limited.

Patent Document 5 describes that the maximum content of ascorbic acid is 32.4 ppm.

As described above, in Patent Documents 1 to 5, the content of ascorbic acid in ascorbic acid-containing fat cannot be improved, and thus Patent Documents 1 to 5 cannot be adapted for a wide range of concentration.

In consideration of the conventional arts, an object of the present invention is to provide an ascorbic acid-containing fat that has an improved content of ascorbic acid in the ascorbic acid-containing fat, and enables to use it in various foods and adaptation for a wide range of concentration.

A preferred aspect is to provide an ascorbic acid-containing fat in which the ascorbic acid may be stably dispersed even under conditions such as being kept at a high temperature or being stirred.

Means for Solving Problems

The present inventors have intensively studied to solve the above problems. As a result, they have found that ascorbic acid may be stably contained at a high concentration and a dispersion stability may be improved by making ascorbic acid content 50 to 50,000 mass ppm as ascorbic acid equivalent and adjusting pH of ascorbic acid solution to specific range. The present invention has been completed based on these findings.

That is, the present invention is:

(1) a fat composition including an ascorbic acid at an amount of 50 to 50,000 mass ppm as ascorbic acid equivalent as an aqueous solution having a pH of 2.5 to 5.3;

(2) the fat composition of (1), including an oil-soluble emulsifier;

(3) the fat composition of (2), including a glycerin;

(4) the fat composition of any of (1) to (3), where an average particle size of an aqueous phase is 1,000 nm or less;

(5) a food including the fat composition of any of (1) to (4) at an amount of 100 to 5,000 mass ppm;

(6) a method for producing a fat composition, the method including mixing an oil phase and an aqueous phase, where a pH of the aqueous phase is adjusted to 2.5 to 5.3, and where the aqueous phase is an aqueous solution containing an ascorbic acid at an amount of 50 to 50,000 mass ppm as ascorbic acid equivalent relative to the oil phase;

(7) the method of (6), where a water content is adjusted to 0.5 to 2.0 times a content of the ascorbic acid;

(8) the method of (6) or (7), where the oil phase contains an oil-soluble emulsifier;

(9) the method of (8), where the oil phase contains a glycerin;

(10) a method for stably dispersing an aqueous ascorbic acid solution in a fat composition, including containing an ascorbic acid as an aqueous solution having a pH of 2.5 to 5.3 in the fat composition, where the fat composition contains an ascorbic acid at an amount of 50 to 50,000 mass ppm as ascorbic acid equivalent;

(11) the fat composition of (1), where a melting point of an oil phase is 20° C. or more.

Effect of Invention

The present invention enables to improve an ascorbic acid content of an ascorbic acid-containing fat and to provide the ascorbic acid-containing fat which may be used in any foods with wide range of concentrations.

In a preferred aspect, an ascorbic acid is stably dispersed in the fat composition of the present invention. In a further preferred aspect, the ascorbic acid is stably dispersed in the fat composition of the present invention even under conditions such as being held at a high temperature or being stirred.

Further, the fat composition of the present invention may be efficiently and stably dispersed in foods.

In a more preferred aspect, the ascorbic acid may be dispersed at a higher concentration than before, and thus the composition may be used for foods having a relatively low fat content. Thus, the effects of ascorbic acid-containing fat, for example, an improvement of oxidative stability and an improvement of taste such as salty taste, may be widely extended in various foods.

MODE FOR CARRYING OUT INVENTION

Hereinafter, the present invention will be described in more detail.

A fat composition of the present invention contains an ascorbic acid at an amount of 50 to 50,000 mass ppm as ascorbic acid equivalent.

The fat composition of the present invention is adapted for a wide range of concentration from low concentration to high concentration. The content of ascorbic acid is preferably 50 to 40,000 mass ppm, more preferably, 50 to 35,000 mass ppm, and further preferably 50 to 30,000 mass ppm, as ascorbic acid equivalent.

The content of ascorbic acid is preferably 100 to 40,000 mass ppm, more preferably 500 to 35,000 mass ppm, and further preferably 1,000 to 30,000 mass ppm, as ascorbic acid equivalent, from the viewpoint of being capable of being dispersed at a high concentration.

As used herein, the ascorbic acid equivalent is calculated by converting it into a value as ascorbic acid contained therein, for example, when ascorbate is used. Specifically, when sodium ascorbate is used, with respect to this molecular weight of 198.11 g, the molecular weight of ascorbic acid is 176.13 g. Therefore, if sodium ascorbate is used at an amount of A g, it is converted to A×(176.13/198.11) as ascorbic acid. The calculated amount is referred to herein as ascorbic acid equivalent.

The fat composition of the present invention contains the ascorbic acid as an aqueous solution having a pH of 2.5 to 5.3. Preferably, the fat composition contains the ascorbic acid as an aqueous solution having a pH of 3.0 to 5.3. More preferably, it is 3.3 to 5.3. A dispersiblity of ascorbic acid in the fat is improved by adjusting within such a range. When the pH is less than 2.5, ascorbic acid may crystallize and precipitate under conditions of heating and stirring. Further, when the pH exceeds 5.3, a taste enhancing effect may be impaired.

The pH of the ascorbic acid aqueous solution may be adjusted by using various alkalis and weak acid salts or by combining ascorbic acid and ascorbate in a preparation of the aqueous phase. In addition, the pH of the aqueous solution of ascorbic acid may be adjusted by, dispersing an aqueous solution of ascorbic acid without adjusting pH into fat, and then dispersing various alkalis and weak acid salts or blending an oil-soluble basic substance such as fatty acid salt and sodium stearoyl lactate. Also in these cases, it can be considered that the ascorbic acid is contained as an aqueous solution within the adjusted pH range.

In a preferred aspect, the aqueous phase may be prepared quickly by using ascorbic acid and ascorbate in combination because pH adjustment becomes easy and the melting rate is fast.

At the time of preparing the aqueous phase, the ascorbic acid and ascorbate to be used must be dissolved. Whether or not it is dissolved is determined by, for example, confirming that precipitation does not occur when the solution is subjected to centrifugation. More specifically, when a precipitate is not visually confirmed after subjecting 5 ml aqueous phase placed in a 20 ml centrifuge tube to centrifugation at 3,000 G for 1 minute at room temperature, 25° C., it is assumed as substantially dissolved.

Examples of fats that may be used for the fat composition of the present invention include vegetable fats such as rapeseed oil, soybean oil, sunflower seed oil, cotton seed oil, groundnut oil, rice bran oil, corn oil, safflower oil, olive oil, kapok oil, sesame oil, evening primrose oil, palm oil, palm kernel oil, coconut oil, medium-chain fatty acid-containing fat (MCT), shea butter, and sal fat; animal fats such as milk fat, beef tallow, lard, fish oil, and whale oil; algae oil; and processed fat thereof such as hydrogenated oil, fractionated oil, hydrogenated fractionated oil, fractionated hydrogenated oil, and interesterified oil; and mixed fat thereof. The ascorbic acid is stably dispersed in the fat composition of the present invention even under conditions such as being held at a high temperature or being stirred. Thus, the composition may be used to fat without limitation also in a fat which has 20° C. or higher of melting point and needs to be stored at a high temperature before use.

In the fat composition of the present invention, a fat-soluble emulsifier is desirably dissolved in the oil phase. The fat-soluble emulsifier is an emulsifier that may be dissolved in fat, and refers to an emulsifier having an HLB of 7 or less in the present invention. As the fat-soluble emulsifier, one or more selected from polyglycerol esters, sugar esters, sorbitan esters, and monoglycerin fatty acid esters are desirable, more desirably, polyglycerol esters, sugar esters, and distilled monoglycerides are preferred, particularly, polyglycerol esters are preferred, and polyglycerol condensed ricinoleic acid ester is most preferable among polyglycerol esters. Polyglycerol condensed ricinoleic acid ester may be abbreviated as PGPR. The amount of the fat-soluble emulsifier in the oil phase is preferably 0.1 to 10 times the amount of ascorbic acid, more preferably 0.3 to 7 times the amount of ascorbic acid, and further preferably 0.5 to 5 times the amount of ascorbic acid. By using an appropriate amount of an appropriate emulsifier, the dispersion stability of ascorbic acid may be improved, and thereby the function of ascorbic acid-containing fat composition may be exerted. In case that the amount of the emulsifier is excessive, when the fat composition of the present invention is used for foods, decrease in eating quality due to flavor derived from the emulsifier and unintended inhibition of emulsification occur, which impairs the quality of foods.

The fat composition of the present invention preferably contains glycerin. When the composition contains glycerin, the ascorbic acid may be stably dispersed at a high concentration, which is preferable. In particular, when ascorbic acid is contained in fat at an amount of 1,000 mass ppm or more as ascorbic acid equivalent, glycerin is desirably contained. Even when the content of ascorbic acid is less than 1,000 mass ppm, the glycerin contributes to stable dispersion.

The content of the glycerin is preferably 0.01 to 10 times the amount of ascorbic acid, more preferably 0.1 to 7 times the amount of ascorbic acid, and further preferably 0.3 to 5 times the amount of ascorbic acid. A larger blended amount results in improved dispersion stability of ascorbic acid. However, excessive amount inhibits dispersion stability and causes precipitation of ascorbic acid.

An apparatus, a mixer or a stirrer, may be used for mixing an oil phase and an aqueous phase. The apparatus is not particularly limited, and an apparatus which may prevent contaminating air during mixing and stirring is preferable. A mixing and emulsifying apparatus such as a high pressure homogenizer may be exemplified.

The fat composition of the present invention is preferably adjusted such that the emulsified particle size is 1,000 nm or less. The emulsified particle size is more preferably 500 nm or less, and further preferably 300 nm or less. By adjusting the average emulsified particle size to 1,000 nm or less, ascorbic acid may be stably dispersed at a high concentration, which is preferable. When the average emulsified particle size exceeds 1,000 nm, the dispersion stability deteriorates, which is not preferable. In the present invention, the average emulsified particle size is determined by dynamic light scattering. For the case where the emulsified particle size exceeds 1,000 nm, the emulsified particle size is determined by a laser diffraction method because it is difficult to analyze the size by dynamic light scattering.

In another aspect, the fat composition of the present invention may be prepared to contain water in an amount of 0.5 to 2.0 times the amount of ascorbic acid. A dispersion stability may be improved by adjusting the water content.

In a preferred aspect, the dispersion stability may be further improved by adjusting the water content and containing glycerin.

As a method for adjusting the water content, a dehydration process may be performed in addition to the method using an ascorbic acid aqueous solution having a saturated solubility or higher as described in the present specification. The dehydration process is not limited as long as the content of water may be adjusted to a content specified in the present invention. A method may be exemplified in which water in a mixture of an oil phase and an aqueous phase that have been mixed and emulsified is distilled out with stirring, and various stirrers may be used. Examples of the stirring method include a method including using an inert gas for preventing oxidization and deterioration of fat, and distilling out water while performing bubbling agitation with the inert gas from the bottom of the container charged with a mixture of an oil phase and an aqueous phase that have been mixed and emulsified. For efficiently performing dehydration, a method of performing dehydration in a vacuum is preferable.

Examples of the method of dehydrating in a vacuum include a method including stirring under the condition of 50 to 130° C. and 0.5 to 50 Torr (0.067 kPa to 6.67 kPa), and adjusting the amount of water to be 0.5 to 2.0 times the amount of ascorbic acid.

The fat composition of the present invention may stably disperse ascorbic acid. Specifically, the composition may maintain a state in which ascorbic acid in fat is uniformly dispersed under conditions of heating and stirring. As an index of ability of stably dispersing ascorbic acid, the dispersion stability is evaluated herein by the presence or absence of precipitation after stirring at 60° C.

The fat composition of the present invention has an effect of enhancing the amount of taste itself, and further has an effect of reinforcing a rise of expression of taste, or persistence of taste without modifying original tastes such as salty taste, sour taste, pungent taste, and umami of food materials containing, particularly, taste materials, such as salty taste materials, sour taste materials, pungent taste materials, and umami materials which are characteristics of the ascorbic acid-containing fat composition. By improving dispersibility, this effect is kept high. This effect may be evaluated herein using an effect of enhancing salty taste as an index by preparing a taste enhancing fat having a predetermined content of ascorbic acid using an ascorbic acid-containing fat composition.

The fat composition of the present invention contains ascorbic acid and has favorable dispersion stability, and may exhibit favorable oxidative stability. For the effect related to the oxidative stability of the fat composition according to the present invention, a predetermined determination index may be obtained by a CDM test. Here, the CDM (Conductmetric Determination Method) may be used as an indicator for evaluation of oxidative stability of fat. A greater measurement value of the CDM indicates excellent oxidative stability. The CDM test may be performed using a dedicated test instrument (Rancimat). The specific measurement method of this method is also described in Examples. All the measurement methods are an acceleration test performed at a higher temperature than presumed use aspect.

The fat composition of the present invention may be adapted for a wide range of concentration and thus may be used for various foods. Examples of the food include seasonings such as dressing and mayonnaise, taste fillings and spreads such as pizza sauce, margarine and shortening, cooked foods such as retort curry, roux such as stew and curry, frozen foods such as fried chicken, dressed breads, processed meats such as sausage, fish pastes such as hanpen or foods prepared by cooking these products, rice confectioneries such as fried rice crackers, snack foods such as potato chips, corn snacks, and pretzels, frozen desserts, ice mix, and other confectioneries and Japanese confectioneries in which taste may be felt.

It is preferable that the fat composition of the present invention is contained in such a food at an amount of 100 to 5,000 mass ppm.

In a preferred aspect, the fat composition of the present invention may also be used for sauces, soups, beverages, fat for preventing sticking of cooked rice, frozen desserts, which have a small content of fat and are limited in their use.

Further, ascorbic acid may be efficiently stably dispersed in fat itself with a small amount of addition of the fat composition of the present invention, and the fat composition of the present invention may be used as a formulation of ascorbic acid with a high concentration. Since a special dispersion apparatus is not necessary for such use, fat containing ascorbic acid may be obtained as a formulation in various use of fat by adding the fat composition of the present invention.

The fat composition of the present invention may contain arbitrary components such as colorant, emulsifier, antioxidant, antifoaming agent, and flavor, as long as the effect of the present invention is not impaired. The total amount of the arbitrary components to be blended is preferably 5% by mass or less, more preferably 3% by mass or less, and most preferably 1% by mass or less in the fat composition of the present invention.

Examples

Hereinafter, the present invention will be described in more detail by way of Examples, but the spirit of the present invention is not limited by the following Examples. In Examples, % and part are based on weight.

(Method of Preparing Fat Composition)

An oil phase part was prepared in accordance with the formulation described in the column of the oil phase of formulation of fat composition in Tables. Similarly, an aqueous phase part was prepared in accordance with the formulation described in the column of aqueous phase of formulation of fat composition in Tables. These were prepared at 25° C. unless otherwise stated in the test examples. A low water content system was prepared at 60° C. In each case, the aqueous phase in which ascorbic acid was dissolved was prepared. Any of the aqueous phases was confirmed as substantially dissolved because no precipitate was visually observed by centrifuging 5 ml of the aqueous phase placed in a 20 ml centrifuge tube at 3,000 G for 1 minute.

A temperature of the oil phase part was set to be 25° C., and the aqueous phase part was blended while stirring by HOMOMIXER (TK homomixer MARKII: available from PRIMIX Corporation) at 8,000 rpm. Stirring was performed in this state for 10 minutes. The raw materials and additives used were as follows.

(Raw Materials and Additives)

As fat, "refined rapeseed oil", palm olein "Palm Ace N", and "refined palm oil" available from Fuji Oil Co., Ltd., were used. A melting point of the refined palm oil was 37° C.

As an oil-soluble emulsifier, polyglycerol condensed ricinoleic acid ester "Poem PR-100", available from Riken Vitamin Co., Ltd. was used.

Ascorbic acid was available from Wako Pure Chemical Industries, Ltd.

Sodium hydroxide was available from Wako Pure Chemical Industries, Ltd.

Sodium ascorbate was available from DSM.

As glycerin, "glycerin food additive", available from Kishida Chemical Co., Ltd. was used.

(Method of Measuring pH of Aqueous Phase)

It was determined by diluting the aqueous phase with distilled water so that an amount of ascorbic acid as ascorbic acid equivalent is 10% by mass, and measuring with a pH meter.

(Method of Measuring Average Particle Size of Aqueous Phase)

An average particle size was determined by a dynamic light scattering method.

(Method of Evaluating Dispersion Stability of Ascorbic Acid-Containing Fat Composition)

It is an evaluation method that accelerates a deterioration of dispersibility due to moisture fluctuation and vibration. A sample, 10 g, was put into a 100 ml screw tube (manufactured by Nichiden Rika Glass Co., LTD.), and stirred (swirled) at 200 rpm using a shaking incubator (manufactured by Taitec corporation: BIO Shaker BR-43FL) in an open system at 60° C. for 7 days. After stirring, a condition after standing overnight was visually evaluated.

The evaluation criteria were "4: clear with no precipitate and crystal, 3: cloudy with no precipitate and crystal, 2: with precipitate and crystal, 1: Many precipitate and crystal were confirmed". And, 3 points or more were considered to be excellent in dispersion stability and passed.

(Method of Evaluating Taste Enhancing Effect of Ascorbic Acid-Containing Fat Composition)

(1) Preparation Method of Taste Enhancing Fat from Ascorbic Acid-Containing Fat Composition Using the ascorbic acid equivalent as a reference, the ascorbic acid-containing fat composition and rapeseed oil are mixed in accordance with the blending ratio in Tables such that the ascorbic acid content is 5 ppm as ascorbic acid equivalent, thus preparing a taste enhancing fat.

(2) Production Method of Non-Fried Potato Chips and Evaluation Method of Taste Enhancing Fat Potatoes (Irish Cobbler potato produced in Hokkaido) were used. Each potato was sliced into 2 mm thick, and soaked in a 3% brine overnight. Moisture was wiped off with paper towel, and then moisture was removed by a microwave oven to prepare dried potato chips.

Subsequently, 20 parts of taste enhancing fat prepared in the above (1) was sprayed on 80 parts of the dried potato chips to prepare non-fried potato chips. Sensory evaluation was performed by 4 panelists, and the case where a strong salty taste was felt as compared to rapeseed oil used section (non-added section) was evaluated as "good" and the case where salty taste was felt equal or less than the rapeseed oil used section was evaluated as "poor".

(Method of Evaluating Oxidative Stability of Ascorbic Acid-Containing Fat Composition)

A CDM value was determined and evaluated by a CDM value in accordance with "the stability test" of the CDM test of the method of the JOCS Standard Methods for the Analysis of Fats and Oils (2.5.1.2-1996) (definition: a clean air is supplied while a sample is heated at 120° C. in a reactor; a volatile decomposition product generated by oxidization is collected in water; and time until the inflection point where the conductivity of water changes rapidly is the CDM value).

A preparation was prepared by mixing an ascorbic acid-containing fat composition and a fat in a blending amount shown in Tables so that an amount of the ascorbic acid was 90 mass ppm as ascorbic acid equivalent.

A CDM value of the preparation was measured, and the preparation containing the ascorbic acid-containing fat composition showing an extension effect of 3 hr or more than the CDM value of the preparation without adding ascorbic acid-containing fat composition was regarded as acceptable.

(Study 1)

Fat compositions shown in the following Table were prepared according to the above (method of preparing fat composition). The following measurements and evaluations were carried out to the prepared fat compositions.

A pH of aqueous phase was measured according to the above (method of measuring pH of aqueous phase), and the results are shown in the following Table.

An average particle size was measured according to the above (method of measuring average particle size of aqueous phase), and the results are shown in the following Table.

A dispersion stability was evaluated according to the above (method of evaluating dispersion stability of ascorbic acid-containing fat composition), and the results are shown in the following Table.

A taste enhancing effect was evaluated according to the above (method of evaluating taste enhancing effect of ascorbic acid-containing fat composition), and the results are shown in the following Table.

An oxidative stability was evaluated according to the above (Method of evaluating oxidative stability of ascorbic acid-containing fat composition), and the results are shown in the following Table.

TABLE 1

| | Formulation of fat composition | | Comparative Example 1 | Comparative Example 2 | Example 1 | Example 2 | Example 3 | Comparative Example 3 | Comparative Example 4 |
|---|---|---|---|---|---|---|---|---|---|
| Oil phase | Rapeseed oil | Part | 99.8950 | 99.8890 | 99.8943 | 99.8941 | 99.8931 | 99.8925 | 99.8923 |
| | Palm olein | Part | | | | | | | |
| | Refined palm oil | Part | | | | | | | |
| | Oil-soluble emulsifier | Part | 0.0450 | 0.0450 | 0.0450 | 0.0450 | 0.0450 | 0.0450 | 0.0450 |
| Aqueous phase | Water | Part | 0.0480 | 0.0480 | 0.0480 | 0.0480 | 0.0480 | 0.0480 | 0.0480 |
| | Glycerin | Part | | | | | | | |
| | Ascorbic acid | Part | 0.0120 | 0.0180 | 0.0120 | 0.0120 | 0.0120 | 0.0120 | 0.0120 |
| | Sodium hydroxide | Part | 0.0000 | 0.0000 | 0.0007 | 0.0009 | 0.0019 | 0.0025 | 0.0027 |
| | Sodium ascorbate | Part | | | | | | | |
| | Total | Part | 100 | 100 | 100 | 100 | 100 | 100 | 100 |
| | Ascorbic acid equivalent | | 0.0120 | 0.0180 | 0.0120 | 0.0120 | 0.0120 | 0.0120 | 0.0120 |
| | pH of aqueous phase | | 2.2 | 2.2 | 3.6 | 4.0 | 4.8 | 6.0 | 7.2 |
| | Average particle size | | 358 | 409 | 346 | 361 | 360 | 382 | 339 |

TABLE 1-continued

| Formulation of fat composition | | Comparative Example 1 | Comparative Example 2 | Example 1 | Example 2 | Example 3 | Comparative Example 3 | Comparative Example 4 |
|---|---|---|---|---|---|---|---|---|
| Evaluation result of dispersion stability | | 1 | 1 | 3 | 3 | 3 | 3 | 2 |
| Evaluation of taste enhancing effect | | | | | | | | |
| Rapeseed oil | Part | 95.8333 | 97.2222 | 95.8333 | 95.8333 | 95.8333 | 95.8333 | 95.8333 |
| Ascorbic acid-containing fat composition | Part | 4.1667 | 2.7778 | 4.1667 | 4.1667 | 4.1667 | 4.1667 | 4.1667 |
| Ascorbic acid equivalent | ppm | 5.0 | 5.0 | 5.0 | 5.0 | 5.0 | 5.0 | 5.0 |
| Evaluation result of taste enhancing effect | | Good | Good | Good | Good | Good | Bad | Bad |
| Evaluation of oxidative stability | | | | | | | | |
| Rapeseed oil | Part | 25 | 50 | 25 | 25 | 25 | 25 | 25 |
| Palm olein | Part | | | | | | | |
| Refined palm oil | Part | | | | | | | |
| Ascorbic acid-containing fat composition | Part | 75 | 50 | 75 | 75 | 75 | 75 | 75 |
| Ascorbic acid equivalent | ppm | 90.0 | 90.0 | 90.0 | 90.0 | 90.0 | 90.0 | 90.0 |
| CDM value of preparation | hr | 8.7 | 8.6 | 8.6 | 8.9 | 8.4 | 7.9 | 7.5 |
| CDM value without additive | hr | 5.0 | 5.0 | 5.0 | 5.0 | 5.0 | 5.0 | 5.0 |
| Extension effect | hr | 3.7 | 3.6 | 3.6 | 3.9 | 3.4 | 2.9 | 2.5 |

(Evaluation Result)

The fat compositions of Examples in which the pH of the aqueous phase was adjusted to 2.5 to 5.3 did not generate precipitation before and after the test, and the dispersion stability was good. On the other hand, the Comparative Examples showed significantly reduced dispersion stability, and the dispersion stability was inferior.

The fat compositions of Examples had a taste enhancing effect. On the other hand, among the Comparative Examples, those having more than 5.3 of pH of the aqueous phase did not have a taste enhancing effect.

The fat compositions of Examples were excellent in the extension effect of the oxidative stability.

(Study 2)

Fat compositions shown in the following Table were prepared according to the above (method of preparing fat composition). The following measurements and evaluations were carried out to the prepared fat compositions.

A pH of aqueous phase was measured according to the above (method of measuring pH of aqueous phase), and the results are shown in the following Table.

An average particle size was measured according to the above (method of measuring average particle size of aqueous phase), and the results are shown in the following Table.

A dispersion stability was evaluated according to the above (method of evaluating dispersion stability of ascorbic acid-containing fat composition), and the results are shown in the following Table.

A taste enhancing effect was evaluated according to the above (method of evaluating taste enhancing effect of ascorbic acid-containing fat composition), and the results are shown in the following Table.

An oxidative stability was evaluated according to the above (Method of evaluating oxidative stability of ascorbic acid-containing fat composition), and the results are shown in the following Table.

TABLE 2

| | Formulation of fat composition | | Comparative Example 5 | Example 4 | Comparative Example 6 | Example 5 |
|---|---|---|---|---|---|---|
| Oil phase | Rapeseed oil | Part | | | | |
| | Palm olein | Part | 99.8950 | 99.8942 | | |
| | Refined palm oil | Part | | | 99.8950 | 99.8942 |
| | Oil-soluble emulsifier | Part | 0.0450 | 0.0450 | 0.0450 | 0.0450 |
| Aqueous phase | Water | Part | 0.0480 | 0.0480 | 0.0480 | 0.0480 |
| | Glycerin | Part | | | | |
| | Ascorbic acid | Part | 0.0120 | 0.0120 | 0.0120 | 0.0120 |
| | Sodium hydroxide | Part | | 0.0008 | | 0.0008 |
| | Sodium ascorbate | Part | | | | |
| | Total | Part | 100 | 100 | 100 | 100 |
| | Ascorbic acid equivalent | | 0.0120 | 0.0120 | 0.0120 | 0.0120 |

TABLE 2-continued

| Formulation of fat composition | | Comparative Example 5 | Example 4 | Comparative Example 6 | Example 5 |
|---|---|---|---|---|---|
| pH of aqueous phase | | 2.2 | 3.8 | 2.2 | 3.8 |
| Average particle size | | 483 | 496 | 359 | 401 |
| Evaluation result of dispersion stability | | 1 | 3 | 1 | 3 |
| Evaluation of taste enhancing effect | | | | | |
| Rapeseed oil | Part | 95.8333 | 95.8333 | 95.8333 | 95.8333 |
| Ascorbic acid-containing fat composition | Part | 4.1667 | 4.1667 | 4.1667 | 4.1667 |
| Ascorbic acid equivalent | ppm | 5.0 | 5.0 | 5.0 | 5.0 |
| Evaluation result of taste enhancing effect | | Good | Good | Good | Good |
| Evaluation of oxidative stability | | | | | |
| Rapeseed oil | Part | | | | |
| Palm olein | Part | 25 | 25 | | |
| Refined palm oil | Part | | | 25 | 25 |
| Ascorbic acid-containing fat composition | Part | 75 | 75 | 75 | 75 |
| Ascorbic acid equivalent | ppm | 90.0 | 90.0 | 90.0 | 90.0 |
| CDM value of preparation | hr | 14.6 | 14.8 | 16.9 | 16.8 |
| CDM value without additive | hr | 11.0 | 11.0 | 13.3 | 13.3 |
| Extension effect | hr | 3.6 | 3.8 | 3.6 | 3.5 |

(Evaluation Result)

The fat composition of Example in which the pH of the aqueous phase was adjusted to 2.5 to 5.3 did not generate precipitation before and after the test even when the fat composition was prepared from palm olein, and the dispersion stability was good. On the other hand, the Comparative Example showed significantly reduced dispersion stability, and the dispersion stability was inferior.

The fat composition of Example in which the pH of the aqueous phase was adjusted to 2.5 to 5.3 did not generate precipitation before and after the test even when the fat composition was prepared from refined palm oil which is necessary to heat before use due to more than 20° C. of the melting point, and the dispersion stability was good. On the other hand, the Comparative Example showed significantly reduced dispersion stability, and the dispersion stability was inferior.

The fat compositions of Examples had a taste enhancing effect and were excellent in the extension effect of the oxidative stability.

(Study 3)

Fat compositions shown in the following Table were prepared according to the above (method of preparing fat composition). The following measurements and evaluations were carried out to the prepared fat compositions.

A pH of aqueous phase was measured according to the above (method of measuring pH of aqueous phase), and the results are shown in the following Table.

An average particle size was measured according to the above (method of measuring average particle size of aqueous phase), and the results are shown in the following Table.

A dispersion stability was evaluated according to the above (method of evaluating dispersion stability of ascorbic acid-containing fat composition), and the results are shown in the following Table.

A taste enhancing effect was evaluated according to the above (method of evaluating taste enhancing effect of ascorbic acid-containing fat composition), and the results are shown in the following Table.

An oxidative stability was evaluated according to the above (Method of evaluating oxidative stability of ascorbic acid-containing fat composition), and the results are shown in the following Table.

TABLE 3

| Formulation of fat composition | | | Comparative Example 7 | Example 6 | Comparative Example 8 | Example 7 |
|---|---|---|---|---|---|---|
| Oil phase | Rapeseed oil | Part | | | | |
| | Palm olein | Part | 98.5800 | 98.5320 | 72.0000 | 71.8080 |
| | Refined palm oil | Part | | | | |
| | Oil-soluble emulsifier | Part | 0.30000 | 0.30000 | 12.0000 | 12.0000 |
| Aqueous phase | Water | Part | 0.3200 | 0.3200 | 12.8000 | 12.8000 |
| | Glycerin | Part | | | | |

TABLE 3-continued

| Formulation of fat composition | | Comparative Example 7 | Example 6 | Comparative Example 8 | Example 7 |
|---|---|---|---|---|---|
| Ascorbic acid | Part | 0.80000 | 0.80000 | 3.2000 | 3.2000 |
| Sodium hydroxide | Part | | 0.0480 | | 0.1920 |
| Sodium ascorbate | Part | | | | |
| Total | Part | 100 | 100 | 100 | 100 |
| Ascorbic acid equivalent | | 0.8000 | 0.8000 | 3.2000 | 3.2000 |
| pH of aqueous phase | | 2.2 | 3.7 | 2.2 | 3.8 |
| Average particle size | | 367 | 311 | 350 | 382 |
| Evaluation result of dispersion stability | | 1 | 3 | 1 | 3 |
| Evaluation of taste enhancing effect | | | | | |
| Rapeseed oil | Part | 99.9375 | 99.9375 | 99.9843 | 99.9843 |
| Ascorbic acid-containing fat composition | Part | 0.0625 | 0.0625 | 0.0157 | 0.0157 |
| Ascorbic acid equivalent | ppm | 5.0 | 5.0 | 5.0 | 5.0 |
| Evaluation result of taste enhancing effect | | Good | Good | Good | Good |
| Evaluation of oxidative stability | | | | | |
| Rapeseed oil | Part | 98.8750 | 98.8750 | 99.7187 | 99.7187 |
| Palm olein | Part | | | | |
| Refined palm oil | Part | | | | |
| Ascorbic acid-containing fat composition | Part | 1.1250 | 1.1250 | 0.2813 | 0.2813 |
| Ascorbic acid equivalent | ppm | 90.0 | 90.0 | 90.0 | 90.0 |
| CDM value of preparation | hr | 8.8 | 8.9 | 8.7 | 8.6 |
| CDM value without additive | hr | 5.0 | 5.0 | 5.0 | 5.0 |
| Extension effect | hr | 3.8 | 3.9 | 3.7 | 3.6 |

(Evaluation Result)

The fat compositions of Examples in which the pH of the aqueous phase was adjusted to 2.5 to 5.3 did not generate precipitation before and after the test even when the fat composition was prepared with high concentration of ascorbic acid, and the dispersion stability was good. On the other hand, the Comparative Examples showed significantly reduced dispersion stability, and the dispersion stability was inferior.

The fat compositions of Examples had a taste enhancing effect and were excellent in the extension effect of the oxidative stability.

From the evaluation results, it is clear that the fat composition of the present invention may be applied in a wide concentration range.

(Study 4)

Fat compositions shown in the following Table were prepared according to the above (method of preparing fat composition). The following measurements and evaluations were carried out to the prepared fat compositions.

A pH of aqueous phase was measured according to the above (method of measuring pH of aqueous phase), and the results are shown in the following Table.

An average particle size was measured according to the above (method of measuring average particle size of aqueous phase), and the results are shown in the following Table.

A dispersion stability was evaluated according to the above (method of evaluating dispersion stability of ascorbic acid-containing fat composition), and the results are shown in the following Table.

A taste enhancing effect was evaluated according to the above (method of evaluating taste enhancing effect of ascorbic acid-containing fat composition), and the results are shown in the following Table.

An oxidative stability was evaluated according to the above (Method of evaluating oxidative stability of ascorbic acid-containing fat composition), and the results are shown in the following Table.

TABLE 4

| | Formulation of fat composition | | | Example 8 | Example 9 | Example 10 | Comparative Example 9 |
|---|---|---|---|---|---|---|---|
| Oil phase | Rapeseed oil | Part | | 99.8926 | 99.8850 | 99.8860 | 99.8890 |
| | Palm olein | Part | | | | | |
| | Refined palm oil | Part | | | | | |
| | Oil-soluble emulsifier | Part | | 0.0450 | 0.0450 | 0.0450 | 0.0450 |

TABLE 4-continued

| Formulation of fat composition | | | Example 8 | Example 9 | Example 10 | Comparative Example 9 |
|---|---|---|---|---|---|---|
| Aqueous phase | Water | Part | 0.0480 | 0.0480 | 0.0480 | 0.0480 |
| | Glycerin | Part | | | | |
| | Ascorbic acid | Part | 0.0120 | 0.0120 | 0.0030 | 0.0000 |
| | Sodium hydroxide | Part | | | | |
| | Sodium ascorbate | Part | 0.0024 | 0.0100 | 0.0180 | 0.0180 |
| | Total | Part | 100 | 100 | 100 | 100 |
| | Ascorbic acid equivalent | | 0.0141 | 0.0209 | 0.0190 | 0.0160 |
| | pH of aqueous phase | | 3.5 | 4.0 | 5.0 | 7.5 |
| | Average particle size | | 538 | 560 | 380 | 482 |
| | Evaluation result of dispersion stability | | 3 | 3 | 3 | 1 |
| | Evaluation of taste enhancing effect | | | | | |
| | Rapeseed oil | Part | 96.4623 | 97.6065 | 97.3688 | 96.8755 |
| | Ascorbic acid-containing fat composition | Part | 3.5377 | 2.3935 | 2.6312 | 3.1245 |
| | Ascorbic acid equivalent | ppm | 5.0 | 5.0 | 5.0 | 5.0 |
| | Evaluation result of taste enhancing effect | | Good | Good | Good | Bad |
| | Evaluation of oxidative stability | | | | | |
| | Rapeseed oil | Part | 36.3225 | 56.9182 | 52.6388 | 43.7602 |
| | Palm olein | Part | | | | |
| | Refined palm oil | Part | | | | |
| | Ascorbic acid-containing fat composition | Part | 63.6775 | 43.0818 | 47.3612 | 56.2398 |
| | Ascorbic acid equivalent | ppm | 90.0 | 90.0 | 90.0 | 90.0 |
| | COM value of preparation | hr | 8.5 | 8.4 | 8.5 | 7.7 |
| | CDM value without additive | hr | 5.0 | 5.0 | 5.0 | 5.0 |
| | Extension effect | hr | 3.5 | 3.4 | 3.5 | 2.7 |

(Evaluation Result)

The fat compositions of Examples in which the pH of the aqueous phase was adjusted to 2.5 to 5.3 did not generate precipitation before and after the test even when the fat composition was prepared using sodium ascorbate, and the dispersion stability was good. On the other hand, the Comparative Examples showed significantly reduced dispersion stability, and the dispersion stability was inferior.

The fat compositions of Examples had a taste enhancing effect. On the other hand, among the Comparative Examples, those having more than 5.3 of pH of the aqueous phase did not have a taste enhancing effect.

The fat compositions of Examples were excellent in the extension effect of the oxidative stability.

By using sodium ascorbate, pH adjustment is easy and the melting rate is fast, so that the aqueous phase may be prepared quickly.

(Study 5)

Fat compositions shown in the following Table were prepared according to the above (method of preparing fat composition). The following measurements and evaluations were carried out to the prepared fat compositions.

A pH of aqueous phase was measured according to the above (method of measuring pH of aqueous phase), and the results are shown in the following Table.

An average particle size was measured according to the above (method of measuring average particle size of aqueous phase), and the results are shown in the following Table.

A dispersion stability was evaluated according to the above (method of evaluating dispersion stability of ascorbic acid-containing fat composition), and the results are shown in the following Table.

A taste enhancing effect was evaluated according to the above (method of evaluating taste enhancing effect of ascorbic acid-containing fat composition), and the results are shown in the following Table.

An oxidative stability was evaluated according to the above (Method of evaluating oxidative stability of ascorbic acid-containing fat composition), and the results are shown in the following Table.

TABLE 5

| Formulation of fat composition | | | Comparative Example 10 | Example 11 | Example 12 | Comparative Example 11 |
|---|---|---|---|---|---|---|
| Oil phase | Rapeseed oil | Part | 99.8927 | 99.8920 | 99.8883 | 99.8875 |
| | Palm olein | Part | | | | |
| | Refined palm oil | Part | | | | |
| | Oil-soluble emulsifier | Part | 0.0450 | 0.0450 | 0.0450 | 0.0450 |
| Aqueous phase | Water | Part | 0.0143 | 0.0143 | 0.0168 | 0.0168 |
| | Glycerin | Part | 0.0360 | 0.0360 | 0.0360 | 0.0360 |
| | Ascorbic acid | Part | 0.0120 | 0.0120 | 0.0120 | 0.0120 |
| | Sodium hydroxide | Part | | 0.0007 | 0.0019 | 0.0027 |
| | Sodium ascorbate | Part | | | | |
| | Total | Part | 100 | 100 | 100 | 100 |
| | Ascorbic acid equivalent | | 0.0120 | 0.0120 | 0.0120 | 0.0120 |
| | pH of aqueous phase | | 2.2 | 3.7 | 4.8 | 5.5 |
| | Average particle size | | 293 | 409 | 330 | 351 |
| | Evaluation result of dispersion stability | | 1 | 4 | 4 | 2 |
| | Evaluation of taste enhancing effect | | | | | |
| | Rapeseed oil | Part | 95.8333 | 95.8333 | 95.8333 | 95.8333 |
| | Ascorbic acid-containing fat composition | Part | 4.1667 | 4.1667 | 4.1667 | 4.1667 |
| | Ascorbic acid equivalent | ppm | 5.0 | 5.0 | 5.0 | 5.0 |
| | Evaluation result of taste enhancing effect | | Good | Good | Good | Bad |
| | Evaluation of oxidative stability | | | | | |
| | Rapeseed oil | Part | 25 | 25 | 25 | 25 |
| | Palm olein | Part | | | | |
| | Refined palm oil | Part | | | | |
| | Ascorbic acid-containing fat composition | Part | 75 | 75 | 75 | 75 |
| | Ascorbic acid equivalent | ppm | 90.0 | 90.0 | 90.0 | 90.0 |
| | COM value of preparation | hr | 8.8 | 9.0 | 8.6 | 8.1 |
| | CDM value without additive | hr | 5.0 | 5.0 | 5.0 | 5.0 |
| | Extension effect | hr | 3.8 | 4.0 | 3.6 | 3.1 |

(Evaluation Result)

The fat compositions of Examples in which the pH of the aqueous phase was adjusted to 2.5 to 5.3 did not generate precipitation before and after the test even when the fat composition was prepared with low water content, i.e. water content was adjusted to 0.5 to 2.0 times a content of the ascorbic acid, and the dispersion stability was good. On the other hand, the Comparative Examples showed significantly reduced dispersion stability, and the dispersion stability was inferior.

The fat compositions of Examples had a taste enhancing effect. On the other hand, among the Comparative Examples, those having more than 5.3 of pH of the aqueous phase did not have a taste enhancing effect.

The fat compositions of Examples were excellent in the extension effect of the oxidative stability.

The fat composition with a low water content using glycerin showed greatly reduced turbidity during stirring at 60° C., and had more excellent dispersion stability.

The rapeseed oil preparation product obtained by diluting the fat composition of the present invention also had an excellent extension effect of oxidative stability.

The present invention enables to obtain food containing ascorbic acid, and having improved oxidative stability and enhanced taste, by adding a fat composition of the present invention in which the ascorbic acid concentration range is optimally adjusted to food having any fat content.

INDUSTRIAL APPLICABILITY

The present invention enables to provide ascorbic acid-containing fat that has an improved content of ascorbic acid in ascorbic acid-containing fat, and enables to use in various foods.

The invention claimed is:

1. A method for producing a fat composition, the method comprising mixing an oil phase and an aqueous phase, wherein a pH of the aqueous phase is adjusted to 3.5 to 5.3, wherein the aqueous phase is an aqueous solution comprising an ascorbic acid in an amount of 50 to 50,000 mass ppm as an ascorbic acid equivalent relative to the oil phase, and wherein the oil phase comprises glycerin, wherein the aqueous phase is dispersed in the oil phase, and wherein the fat composition is edible.

2. The method according to claim 1, wherein the amount of ascorbic acid is 100 to 40,000 mass ppm as ascorbic acid equivalent, and wherein an amount of water is adjusted to 0.5 to 2.0 times the amount of the ascorbic acid.

3. The method according to claim 1, wherein the oil phase further comprises an oil-soluble emulsifier.

4. The method according to claim 3, wherein the oil phase comprises the glycerin in an amount of 0.3 to 5 times the amount of the ascorbic acid.

5. The method according to claim 2, wherein the oil phase further comprises an oil-soluble emulsifier.

6. The method according to claim 5, wherein the oil phase comprises the glycerin in an amount of 0.3 to 5 times the amount of the ascorbic acid.

* * * * *